Figure 1:
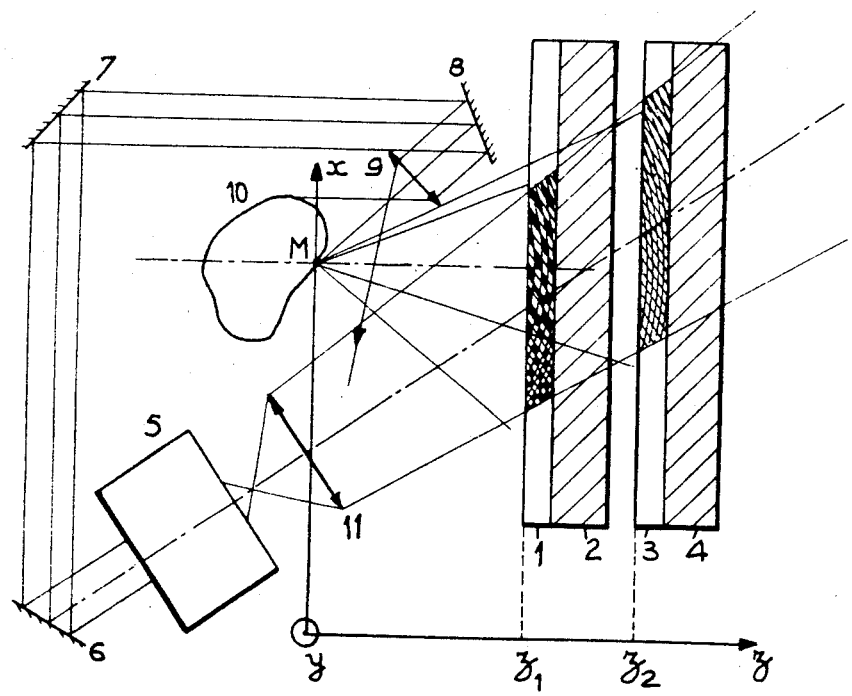

United States Patent
Belvaux

[11] 3,752,557
[45] Aug. 14, 1973

[54] SYSTEM OF HOLOGRAM REPRODUCTION
[75] Inventor: Yves Belvaux, Paris, France
[73] Assignee: CSF-Compagnie Generale De Telegraphie Sans Fil, Paris, France
[22] Filed: May 31, 1967
[21] Appl. No.: 642,490

[30] Foreign Application Priority Data
June 10, 1966  France .................. 6665035

[52] U.S. Cl. ........................ 350/3.5, 355/2
[51] Int. Cl. ............................ G02b 27/00
[58] Field of Search ..................... 350/3.5, 2

[56] References Cited
OTHER PUBLICATIONS
Rogers, Proc. of Royal Soc. of Edinburgh, Vol. 63, Sec. A, pp. 206–209 and 217 (1952).
Harris et al., Applied Optics, Vol. 5, No. 4, pp. 665–666, (April 1966).
Jacobson et al., Applied Optics, Vol. 4, No. 11, pp. 1509–1510, (Nov. 1965).

*Primary Examiner*—David Schonberg
*Assistant Examiner*—Ronald J. Stern
*Attorney*—Cushman, Darby & Cushman

[57] ABSTRACT

An optical method for copying holograms from an original. The photographic support on which a copy is to be made, is positioned behind the original hologram and the whole is exposed to the monochromatic coherent light; the original and the copying supports need not be in contact and the copy is not a reproduction of the original hologram but has the same image forming capabilities as the latter. The exposed copy is processed according to conventional photographic technics.

6 Claims, 2 Drawing Figures

SYSTEM OF HOLOGRAM REPRODUCTION

The present invention relates to optical systems for recording holograms on a photographic plate. A hologram is a system of interference fringes resulting from the interaction of two waves, one of them being reflected by an object illuminated by coherent monochromatic light and the other directly incoming from the source of this light. As is known, by means of a hologram, three-dimensional representations of objects can be obtained by placing the hologram in the path of a beam of monochromatic and coherent light.

Once a hologram has been obtained, the problem arises of obtaining a great number of copies thereof. The photographic techniques of printing by contact or enlargement are not applicable because a hologram is not a two-dimensional image but a network of minute fringes distributed in the body of the sensitized emulsion with a spacing approaching one micron.

It is an object of this invention, to provide a system enabling an original hologram to be reproduced on photographic plates.

According to the invention, there is provided a method for reproducing an original hologram recorded on a photographic material, said method comprising the following steps: positioning behind said original hologram a fresh photographic support; directing on said original hologram a beam of coherent and monochromatic energy for exposing said fresh material to the luminous energy transmitted by said original hologram and processing the photographic support thus exposed, whereby a secondary hologram is formed having all the image forming capabilities of said original hologram.

Figure 2:
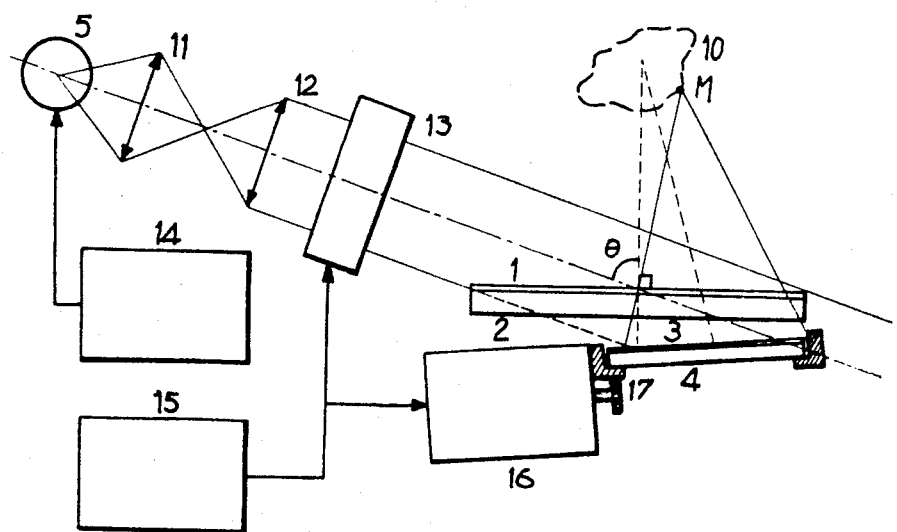

For a better understanding of the invention and to show how the same may be carried into effect reference will be made to the drawing accompanying the following description and in which:

FIG. 1 is an explanatory diagram; and
FIG. 2 shows one embodiment of a system according to the invention.

In the diagram of FIG. 1 can be seen a source of monochromatic and coherent light 5 illuminating an object 10 by means of mirrors 6, 7 and 8 and lens 9. A system of axes $o\,x\,y\,z$ in which the plane $x\,o\,y$ contains the point M of the object 10, serves as reference frame for a photographic plate, whose edge is visible in FIG. 1. This plate comprises a sensitive emulsion 1 applied to a transparent base 2 and is located at the distance $Z_1$ from the point M. The light source 5, by way of the dioptric system 11, illuminates the emulsion 1 which receives on its input surface at $Z = Z_1$ two complex light amplitude distributions. The first $A(x,y)$ results from the electromagnetic field reflected by the object 10 and the second $A_o(x,y)$ is produced by the reference beam emitted from the aperture 11. The light intensity $I(x,y)$ received by the emulsion is, as is well known:

$$I = |A + A_o|^2 = |A|^2 + |A_o|^2 + A A_o^* + A^* A_o$$

where $A^*$ represents the complex conjugate of $A$.

This intensity $I$ determine a transparency law $t(x,y)$, after exposure and development of the plate 1 - 2, a corresponding transparency function which characterizes the original hologram of the object 10. This law is expressed as a function of gamma $\gamma$ by: $t = I^{-\gamma/2}$ and can be put, as is known, in the simple form:

$$t \approx 1 - A A_o^* - A^* A_o$$ if the following simplifications are accepted $$\gamma = 2,\ |A_o| = 1 \text{ and } |A| << |A_o|.$$

If the sensitive layer were infinitely thin, one would obtain a plane system of interference fringes, but as FIG. 1 shows, the impression of the emulsion 1 takes place throughout its thickness, which makes it impossible to copy the hologram by contact or enlargement when the fringe spacing is small. Once a hologram has been formed, the object 10 and its illuminating system 6 - 7 - 8 - 9 can be withdrawn, only the source 5, which emits the reference beam through the aperture 11, remaining. The hologram 1 - 2 then radiates a modulated electromagnetic field whose distribution $A_o$ measured in the plane $Z = Z_1$, is :

$$A_o\,t \approx A_o - A - A^* A_o^2$$

(1).

Observing the component A of the diffracted field from behind hologram 1 - 2, one can see a virtual image of the object 10; the component $A_o$ represents the reference beam following its path beyond the hologram 1 - 2, and the term $A^* A_o^2$ provides a conjugate image different from the former. in order to copy the hologram 1 - 2, the invention provides for the positioning of a photographic plate 3 - 4, comprising an emulsion 3 and a plate 4, which receives the light filtered by the hologram 1 - 2 in the prolongation of the reference beam.

Considering, in expression (1), the quantities $A_o$ and $A$ which characterize respectively the reference beam and the electromagnetic field issuing from the virtual image of object 10 seen by transparency, one obtains the conditions existing when the original hologram 1-2 was formed, except that the abscissa of the plate 3 - 4 is $Z_2$ and not $Z_1$. In many cases, if the virtual iamge is of good quality, the conjugate image is almost nonexistent.

Disregarding the interval between the two plates, for the purpose of simplification, one obtains on the plate 3 - 4 a distribution $I'$ of light intensities such that:

$$I' = |A_o - A|^2 = |A_o|^2 + |A|^2 - A A_o^* - A^* A_o$$

and by means of a calculation similar to the previous one, a law of transparency $t'$ for the hologram copy 3 - 4, of:

$$t' \approx 1 + A A_o^* + A_o A^*.$$

This hologram copy illuminated by the reference beam, generates an electromagnetic field $A_o\,t'$ such that:

$$A_o\,t' \approx A_o + A A_o^* A_o + A_o A^* A_o$$ which by reason of the simplification made previously can be written:

$$A_o\,t' \approx A_o + A + A^* A_o^2$$

(2).

By comparing (1) and (2), one sees that an observer, situated behind the hologram copy 3 - 4 illuminated by the reference beam, will still see the virtual image of the object 10, the point M being at the distance $Z_2$ from the emulsion.

Although the hologram copy 3 - 4 is not absolutely identical to hologram 1 - 2, it belongs to the family of holograms capable of restoring the image of the object 10, since the accepted simplifications do not have any bearing on the results. In cases where one has to take account of the term $A^* A_o^2$ which has been disregarded, one can show that the conjugate image associated with the virtual image of the object adds additional information which increases the degree of modulation of the hologram copy; it is then advisable to place the two emulsions 1 and 3 very near to each other.

It should also be pointed out that after an original hologram has been taken with a reference beam, one can copy it with a beam of different geometry, different wavelength, and different angle of incidence, provided that the light source which produces it has a length of coherence greater than the optical interval between the original hologram 1 – 2 and the hologram copy 3 – 4. It is also not necessary for the bases 1 – 2 and 3 – 4 to be plane and placed parallel to each other.

FIG. 2 shows by way of a non-limitative example an apparatus for hologram reproduction in accordance with the method of the invention. It comprises a source 5 of monochromatic light, associated with an optical system 11 – 12 so as to produce a reference beam of wavelength $\lambda$ and coherence length $l$, which beam impinges at the incidence angle $\theta$ on the original hologram 1 – 2 whose fringes from the virtual image 10 of an object. A mechanical device 17 equipped with a gate brings into the path of the references beam fresh photographic plates 3 – 4 which provide the hologram copies after exposure and development. A mechanism 16 ensures the successive positioning of the plates 3 – 4 in the field of the reference beam. Source 5 is supplied by the generator 14. A timer device 15 controls the advance mechanism 16 in synchronization with a shutter system 13 which cuts off the reference beam. The emulsion receives, for a fixed time interval during which it remains at rest, amplitude distributions $A_o$ and $A$ which are characteristic of the reference beam and the virtual image 10; finally it is processed using known techniques. The optical path between emulsions 1 and 3 must be shorter than the coherence length for the transposition to be rendered correctly. This last condition is easily satisfied if the source 5 is a light amplifier of the LASER type; in this case, exposure can be determined by direct control of the emission from the LASER source.

What is claimed, is:

1. A method of copying an off-axis hologram comprising the steps of:

directing an illuminating beam consisting of monochromatic spatially coherent light onto a recording surface of the off-axis hologram at an angle to produce at least one diffracted image beam at a finite angle with respect to the illuminating beam, placing a detector with respect to the hologram so that the detector receives both the illuminating beam and at least one diffracted image beam, said angle of said illuminating beam and the spacing between the recording surfaces of said hologram and said detector being so related as to produce a new interference pattern by the concurrent interaction of the illuminating beam as a reference beam and the diffracted image beam, the detector being sensitive to coherent light and capable of detecting interference fringes, and recording the new interference pattern on the detector produced by the interaction of the illuminating beam and the diffracted image beam as a copy of the hologram.

2. A method as claimed in claim 1, wherein said spacing between the recording surfaces of said holgram and said detector is shorter than the coherence length of said illuminating beam.

3. A method as claimed in claim 1, wherein the wavelength of said illuminating beam is equal to the wavelength of light used to form said hologram.

4. A method as claimed in claim 1, wherein the angle of incidence of said illuminating beam with respect to said hologram is equal to the angle of incidence of the reference beam used to form said hologram.

5. A method as claimed in claim 1, wherein said illuminating beam is supplied from a laser source.

6. A method as claimed in claim 5, wherein said laser source is a pulsed laser whose emission determines the exposure of said detector.

* * * * *